US008447169B2

(12) United States Patent
Lewis (10) Patent No.: US 8,447,169 B2
(45) Date of Patent: May 21, 2013

(54) PROCESS FOR EDITING AND PRODUCING VIDEOS (75) Inventor: Philip Charles Lewis, Rose Bay (AU)

(73) Assignee: Philip Charles Lewis, New South Wales (AU)

(*) Notice: Subject to any disclaimer, the term of this patent is extended or adjusted under 35 U.S.C. 154(b) by 802 days.

(21) Appl. No.: 12/444,802

(22) PCT Filed: Oct. 9, 2007

(86) PCT No.: PCT/AU2007/001524
§ 371 (c)(1),
(2), (4) Date: Jan. 11, 2010

(87) PCT Pub. No.: WO2008/043135
PCT Pub. Date: Apr. 17, 2008

(65) Prior Publication Data
US 2010/0119203 A1 May 13, 2010

(30) Foreign Application Priority Data
Oct. 9, 2006 (AU) ................... 2006905599

(51) Int. Cl.
G11B 27/00 (2006.01)
(52) U.S. Cl.
USPC .......................... 386/278; 386/290
(58) Field of Classification Search
None
See application file for complete search history.

(56) References Cited

U.S. PATENT DOCUMENTS 6,139,329 A * 10/2000 Mino et al. ............... 434/307 A
2001/0040925 A1 * 11/2001 Abelard et al. ......... 375/240.26
2003/0220970 A1 * 11/2003 Komsi ..................... 709/204
2006/0265657 A1 * 11/2006 Gilley ...................... 715/730
2007/0189708 A1 * 8/2007 Lerman et al. ............ 386/52
2011/0289413 A1 * 11/2011 Ubillos et al. ............ 715/723

OTHER PUBLICATIONS

"Digital Video Team-DVD Advance," Mar. 4, 2006.<retrieved on Jan. 25, 2007 at http://web.archive.org/web/20060304043738/http://www.digitalvideoream.co.uk/index.html>.
"Adobe Premiere-Overview,"May 1, 2006.<retrieved on Jan. 25, 2007 at http://web.arcive.org/web/20060501110653/www.adobe.com/products/premiere/overview2.html>.
"WeddingDVD.COm,"Mar. 29, 2006.<retrieved on Jan. 25, 2007 at http://web.archive.org/web/20060329120017/http://weddingdvd.com/index.html>.
Dennis Sellers. "Data spanning butters up Toast 7 nicely," Oct. 4, 2005.<rtrieved on Jan. 25, 207 at http://www.macsimumnews.com/index.php/archive/review_data_spanning_but.
Freeman et al. "Adobe Web Design & Publishing Unleashed,"US: Sams.net Publishing, 1997, 1st edition, ISBN 1575212528.

* cited by examiner

Primary Examiner — William C Vaugh, Jr.
Assistant Examiner — Asher Khan
(74) Attorney, Agent, or Firm — Duane Morris LLP (57) ABSTRACT A process for creating an edited video media, utilizing a computer software system, which comprises the steps of, (a) obtaining some raw video footage, and uploading the footage into the computer software system, if necessary converting the raw video into digital form; (b) cataloguing the raw video footage in a database on the computer; (c) having an operator edit the raw video footage, following a predetermined and standard procedure to create a plurality of video clips; (d) having an operator edit the video clips, following a predetermined and standard procedure to create a plurality of selected shorter segments showing the highlights from at least some of the clips from step (c), and combined as another clip; (e) having an operator add a musical sound track, to the clips of steps (c) and (d); and (f) assembling the clips into a movie, adding standard titles before each clip, and a possibly a standard menu that indexes each clip.

21 Claims, 10 Drawing Sheets

PROCESS FOR EDITING AND PRODUCING VIDEOS

TECHNICAL FIELD

The present invention relates to a method for processing raw video footage, which has been obtained from a variety of sources, and then creating a professional video product from this, without the need for using the services of professional editors and production staff or large production studios. The invention concerns a process and system for editing, archiving and cataloguing videos, that can be easily converted into a professional seeming video DVD (or other media) product. The process can be scaled up to allow many people to operate the system, and these people may not need much prior skill at video editing, and so can operate cost effectively. This system preferably concerns the use of a software system to automate many of the important steps involved in the production process.

BACKGROUND ART

In the past, editing and creating videos was a difficult and expensive process, usually carried out by professional film and video editors and producers. However, in recent times, the amount of video footage has been growing greatly, due to the decrease in cost and increase in availability of digital video making equipment.

Commonly, parents will take copious amounts of video footage of their children for example, at school events or at home. However, this footage is usually left in its raw form, and is not further edited, except by the rare person who may learn to use a commercially available video editing software product. But even such people as these, who may learn how to edit movies, generally do not gain sufficient experience at this task to be able to provide a professional product.

Additionally, if a cost effective and simple process for creating a professional video product were available, then more people would avail themselves of it. A high quality and reasonable cost video product would allow schools, for example, to create a video DVD of their students and classes, in place of the traditional school photo. Such video product could also be provided to schools and teachers as a kit, with a minimum level of training provided, resulting in a professional DVD showing the students, to be sold to the parents, and provided to the school as a record, for instance.

There have been other attempts to edit video material in a cost effective form. For example the "WeddingDVD.com" (www.weddingdvd.com) organisation, takes wedding footage, creates a DVD from this, and provides a DVD and also makes a "streaming video" version available over the internet. However, it appears that this organisation processes the raw footage in the normal manner, using a conventional editing process, where skilled editors create output in a non-standardised way.

As mentioned previously, educated amateurs can use a software editing product, such as "Adobe Premier" to convert raw footage into a final version on the DVD. However, these amateurs would attempt to follow conventional editing techniques, which are time consuming. Scaling up such an approach would not be suitable for handling a large volume of raw throughput. Also, having to use trained staff in order to carry out this approach would make the final product expensive for consumers.

Therefore, there would be a ready market for a system that allows people to take their raw video footage, and to process it so as to create professional seeming video works or movies. This could be carried out by the people themselves, or by other people who may set up a small business to do this, but without the need to master all the skills that professional film editors and producers must learn, and which otherwise would take many years to achieve.

DISCLOSURE OF THE INVENTION

These and other advantages are met with the present invention, which in one broad form concerns a process for creating an edited video media, utilising a computer software system, which comprises the steps of: (a) obtaining some raw video footage, and uploading the footage into the computer software system, if necessary converting the raw video into digital form; (b) cataloguing the raw video footage in a database on the computer; (c) having at least one operator edit the raw video footage, following a predetermined and standard procedure to create a plurality of video clips; (d) having an operator edit the video clips, following a predetermined and standard procedure to create a plurality of selected shorter segments showing the highlights from at least some of the clips from step (c), and combined as another clip; (e) having an operator add a musical sound track, to the clips of steps (c) and (d); and (f) assembling the clips into a movie, and adding standard titles before each clip. Preferably, there may also be a standard menu that indexes each clip.

Preferably the editing in steps (c), (d) and (e) occurs without any input from, or reference to, the owner of the video footage. Also, preferably in step (b) the cataloguing records at least its properties, ownership and a unique identifier.

It is also preferred that the editing in step (c) may involve, editing the raw video footage into separate shorter segments, and selecting and keeping a segment from each individual scene provided in the raw footage, whereby the total running time is reduced to between 10 and 30 minutes per hour of raw footage. Optionally, step (c) may involve editing the raw video footage into separate segments, and selecting and keeping the more interesting segments, and removing the other segments, whereby the total running time is reduced to between 10 and 30 minutes per hour of raw footage.

This process may involve the total running time being reduced to between 15 to 22 minutes per hour of raw footage. Preferably, in step (d), a shorter segment of about 1.5 seconds of running time may also be selected, and added to the output. Also, it is optional that in step (d), the combined clip may be edited to play in slow motion. In this situation, in step (d) the slow motion may be about 4 second scenes at a 30% frame rate. It is also optional that in step (e), the musical sound track may be assembled from a limited selection of music. In this case, the music may be orchestral music. Preferably, the music may be selected to match the mood of the video material.

It is also preferred that after step (f), there is another step, (g) where the movie is placed onto a DVD, which can be played in a DVD player. As another preferred embodiment, the clips may be incorporated within a database, and the database is adapted to allow a customer to re-order the purchase of a movie, previously created.

As another possible alternative, the clips may preferably be incorporated within a computer database, and the database is adapted to allow a customer to request the creation of a different assembly of clips into another movie. It is preferred that the clips may be incorporated within a database, and the database is adapted to archive the clips. As another preferred feature, the database may store the length of time of archival, and the quantity of clips, and is adapted to charge a customer an amount of money commensurate with both. It is also preferred that the system have a capability of access over the internet, or suchlike, so that orders can be placed, and followed through, by a client using a web browser to interact with the video editing application. The invention also involves a kit, which for assists with performing this process and which contains an instructional DVD for training a user on how to provide suitable raw footage, and a blank media for recording the raw footage, and optionally other items to this end. Generally, the standard and predetermined procedure is selected to provide a professionally adept movie, by only following the procedure so chosen.

BRIEF DESCRIPTION OF DRAWINGS

The invention is now discussed with reference to drawings, where:

FIG. 3 shows a screen for entering an order;

FIG. 4 shows a job sheet for use by an operator;

FIG. 5 shows another job sheet for use by an operator;

FIG. 6 shows a report to be sent to a client for confirmation;

FIG. 7 shows an example of a database log of video clips;

FIG. 8 shows a database list of clips for a specific customer;

FIG. 17 shows an example of the details captured on the database for a client who is a school;

FIG. 18 shows more detail of the example of FIG. 17; and

These figures display a single embodiment of the present invention, but the invention may be implemented using other arrangements and a variety of other screens and forms, of which those in the drawings are just examples.

BEST MODES FOR CARRYING OUT INVENTION

The video editing and production system of the present invention preferably operates with the aid of a computer software system that may automate many of the steps in the creation process. In the Figures one such software system is described. However other software may also be created to achieve the same result.

The software system may be one personal computer that runs a software package that embodies the steps of the present invention, or more preferably, is network of such computers that are linked together, to allow a number of operators to process the video material at the same time. The computers should be linked to a server, or the like, which holds a database, that is used to hold the initial raw footage, and the various edited output files created during the process, as well as the output, prior to it being added to a physical medium, such as a DVD, if this is done.

The software system may also include a connection to the internet, that permits interaction from and with clients via this means.

The software system is created using any suitable software package, in order to process the video material in the manner that is described below.

The process generally begins by obtaining a source of video material. This may be videos produced by people themselves, using a digital video camera. It may be video material on film stock, which will initially be converted into digital form for processing in the present invention.

As an optional and preferred step, a video camera, and video recordable tapes for use in the camera, may be provided to a person who will create the video material. In this situation, it is also preferred that the person may also be offered a training course on how to use the camera, or about how to create good video source material. For example, a kit, that may also include the hire of a camera, and that includes a blank digital tape may be provided to a teacher in a school in order to capture video footage of all the children in the class, after which the camera and used tape are both returned to the video editing company, for editing and production of a DVD.

A training course may be provided to users who are inexperienced or who wish to receive some further or refresher training. This training may take place in a classroom situation, or at the offices of the video editing organisation, or on site. An alternative and preferred approach is to provide a video to the user, in the form of a DVD for example, which demonstrates the best techniques and some tricks to be used to capture desirable video raw material. The training ideally should cover the actual techniques for operating the camera and creating usable footage, as well as advice about the best techniques to use to get interesting images. For example, a training DVD can be included in the kit provided to the school teacher. This training DVD will include information about how to achieve the best results, such as how to hold the camera, how to capture interesting footage of the students, and what to do and not do in order to give the best impression of the students and the school. Furthermore, the training material can include information of a general nature about filming in the school environment, such as on health and safety issues, and the like. Specific issues, like what to do if an accident occurs during filming, or how to avoid tripping over when holding the camera, can be covered.

It may also be helpful to include other documents or similar material in the kit to be provided to users in order to simplify the process for the user. For example, copies of a consent form to be signed by a student's parents, an envelope or label for the return of the tape or other material to the editing organisation, and tip sheets which summarise the training high points, may be included in the kit. For example, a kit can be prepared for use in schools, that contains consent and similar forms, a training DVD that will run for about eight or nine minutes, a blank tape for recording the video that is labelled, and some information, all in a folder and envelope.

The source video material may include sound, or may just be images. Old film stock that is being converted into modern digital media, such as being put on to a DVD, may often be without a sound track. Archived film or video content may be converted into more watchable movie product using the present invention. The resulting edited material will include a music track, which modern consumers often expect in quality video products.

The video or film content is converted onto digital form, and stored on a computer. It is then edited using any from a number of existing and commercially available software products. Such editing software includes, Adobe "Premier", Avid "Xpress" or "Pinnacle", Apple "Final Cut Pro/Studio/Express", as just some examples. These products may run on the Apple "Mac", or Microsoft "Windows", operating systems and PCs, some on one, some on the other, and some on both, or on other operating systems such as Unix. It is preferred to use the Apple "Final Cut" product, with the present invention.

Once the raw video footage has been obtained, then it is transported to the editing organisation. There, it is converted into digital form, if this is not already the case. All of the raw video footage provided is uploaded into a computer database.

It is a feature of the invention that all of the video material provided is processed in a standardised way, without the direct input of the customer who is the source of the material. The customer does not provide instructions of what to edit or how to edit the raw material. This saves time in the editing process, and therefore minimizes the costs, and is a departure from the normal editing process, where the client is encouraged to provide production advice concerning their own video material. For instance, traditionally, a client who took video footage of a family get-together would take the raw footage to an editing studio. The editor would then sit down with the client, and go through the raw material, and solicit the client's advice and comments about which parts of the material to utilise and how long each shot should take, and how to organise the material. In contrast, the process of the present invention will take place without any creative input from the client; all the client will provide is a review of the proposed titles and description, to provide basic descriptive information, or to check for the correctness of titles and description proposed by the operator. Otherwise no creative input is accepted from the client, about how the video raw material is to be edited into a final product.

A client may specify a different compilation of edited shots, once the raw material has been edited into suitable shots, and indexed by theme. Different DVDs may be created by assembling different sets of edited shots, according to different themes. However, initially with a new client, all the material provided by the client will be edited and assembled into one or more DVDs, according to the quantity of material provided. For example, this may include material from a number of birthday parties over many years of the client's two children, who are present at each other's parties. Later, the client may wish to provide another DVD just showing one of their children, to give to guests at that child's wedding for instance. The client may then select from among the entire database those edited clips that feature that child, and the editing organisation can then assemble another DVD (or more than one, if desired) of this material. The resulting new DVD is assembled following the standardised procedures, which are described in more detail below.

According to the invention, once the raw material is received, it is then transferred on to a computer hard drive, and preferably into a database, to allow the source, date, and a brief subject content of each item of raw video footage to be recorded and stored. Preferably this function is at least partly, or mostly, automated, using a computer software application.

Then, when the editing is ready to begin, the job of working on the footage is allocated to a person who is to do the editing, the "operator", who in some circumstances may be a professional editor, but generally and preferably is merely a trained semi-professional or only a normally skilled person, who has gained an acceptable knowledge of using the video editing software. If a professional editor is involved, they will merely follow the predetermined steps and processes of the present invention, instead of utilising their high level editing skills. Such a person can normally be trained up to a sufficient knowledge to carry out the editing process using the editing software over about two weeks. They are only required to have a minimum of video editing skill, but should have the requisite skills to operate the editing software program being used. Undergraduate students from film schools will often make good operators.

This person, referred to here as the "operator", who generally is not a professional video editor, will follow a series of set tasks, which allows a standard charge to be billed to the client for the editing. Because of the standardised nature of the editing steps, it is found that a relatively similar amount of time and effort is spent editing each tape, for all operators, and so applying a standard charge to the customer, will usually be appropriate. The operator, may as an alternative, log the time taken to perform the set tasks for each tape, so that the job can be billed to the client, and to allow the operator to be paid for their work according to the amount of time spent. However billing a standardised amount is much preferred according to the invention. The actual time spent may be recorded for use internally to measure the operator's efficiency and performance.

As one preferred function, the software application may generate a "job sheet" which may be on paper, or may be kept electronically on the computer, to be filled in by an operator, with details of the editing. Because the operator follows a standardised procedure, the process need not be completed by the same operator; it is possible for the original operator to suspend the editing process mid-stream at the end of one working day, for instance, and a different operator continue on from there, the next morning. The quality or appearance of the final product would not be affected by this.

The operator then edits the raw material following the standardised procedure. Basically the person watches the raw video material, and updates the data base with some brief description about the subject content. The person then breaks up the raw footage into sections, known as "clips", and logs this information for each clip. Every operator follows standard rules and procedures for editing and cutting the footage, to provide consistent output.

The standardised rules are chosen to give good results. Generally, these will follow normal video editing precepts, but, whereas a professional editor will pick and choose the rules to follow according to their professional judgement and preferences, under the present invention, the rules are followed very consistently. A set of rules and procedures are developed that consistently give good results; a series of two hundred to three hundred different editing rules can be developed by normal trial and experiment, for example, that when applied, provide good results.

The rules may be selected from basic trial and error to give good and consistent results, and once they have been decided upon and approved, they generally will not need to be altered. Some examples of suitable rules, are for instance, that if the video footage is showing little interesting content, such as showing a view of the landscape, then the length of the scene may not exceed 1.5 seconds. Or if there is a pan, then this should have a duration of 1.5 seconds. Or, the music soundtrack should be less than −12 decibels in loudness. Or, if there is clear audio sound this is set at −6 decibels and the sound track is set at −24 decibels, but if not, they are both set at −12 decibels.

The raw footage is edited heavily, so that each hour of raw footage is reduced to a number of clips, preferably totalling between 10 and 30 minutes, and ideally between 15 to 22 minutes. Around two thirds to three quarters of the raw video is discarded during the editing, irrespective of the quality of the material. Each of the clips typically will last from around half a minute to three or four minutes in length.

Ideally, every representative shot included in the raw footage is made into a clip. If several almost identical shots are in the raw footage, then one may be selected, and edited into a clip to appear in the final DVD. The editing process aims to keep the best of every scene or shot, and to create and retain a representative clip of every separate theme appearing in the original video material.

Obviously, during the editing process, the poorer quality footage is discarded, and not made into clips. This may include blurred or badly lit scenes, or duplicated scenes that do not show anything interesting happening, for instance.

Then a video movie is created. A movie is created by an operator from the logged clips. This may be the same operator, or a different person in the editing organisation, and may follow on immediately from the earlier process for creating the clips, or may take place some time later.

In creating the movie, the clips are arranged on a timeline, music tracks and titles are added, effects can be created when fading or moving from one clip to the next, and the finished video is created.

The clips are assembled into a continuous movie, to eventually be copied onto a playable DVD, for example. Each clip is prefaced by titles, with the relevant information to do this being taken from the database, and each title normally consists of the date and a brief description. The software process of the present invention partly or mostly automates this step. The operator only has to select the clips, which are presented in chronological order. Clips fade or cut to the next title and clip.

Importantly, the output is assembled in two sections, a first section of the clips as described above, and a second section, with only the highlights, which is of overall shorter length, and which preferably runs in slow motion. The slow motion preferably consists of 4 second scenes at 30% frame rate, but other slow motion parameters may be used alternatively. For example, the operator may select and initially prepare a series of clips each with a title, lasting 20 minutes in total, and also recut a highlight series consisting of a subset of smaller sections taken from the first set of clips, but lasting only 2 to 3 minutes in total even when played and recorded in slow motion. Each scene of the second section preferably is of about 1.5 seconds duration, and is selected to represent each clip on the DVD movie. Preferably a segment is selected from each, or at least a majority of, the first series of clips.

This second section functions as a summary, and can be played initially when the movie is put in a DVD player, after the main titles and contents information. The slow motion highlights give customers a summary and a quick preview of the remaining material on the movie disk.

The operator records an appropriate descriptive title and date for each clip, if this is possible to do. Again this normally follows a standard procedure, and a regular format. This information is logged into the database, by the operator. Commonly, for example, one hour of raw footage preferably results in 10 to 30 minutes, or more preferably, from 15 to 22 minutes of clipped material. Videos of more interesting events would generate more clips, and those created by more experienced or skilled client or customer, would likewise generally result in more usable footage.

Figure 1:
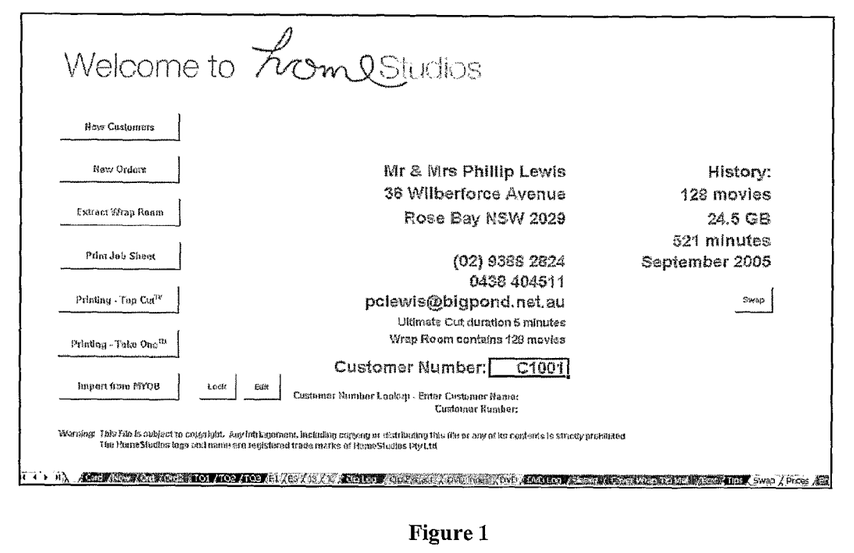
FIG. 1 shows a computer screen snapshot of an initial home page.
Figure 2:
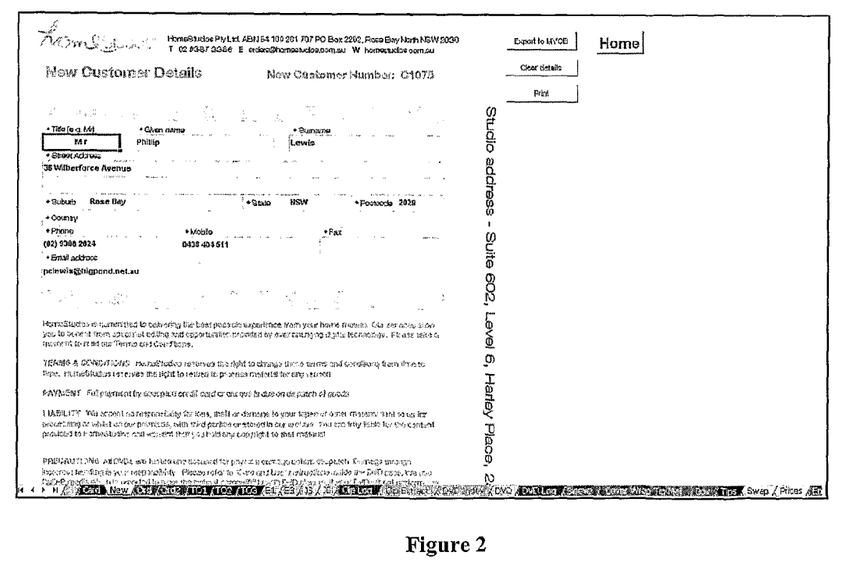
FIG. 2 shows a screen for entering details of a new customer.
Figure 9:
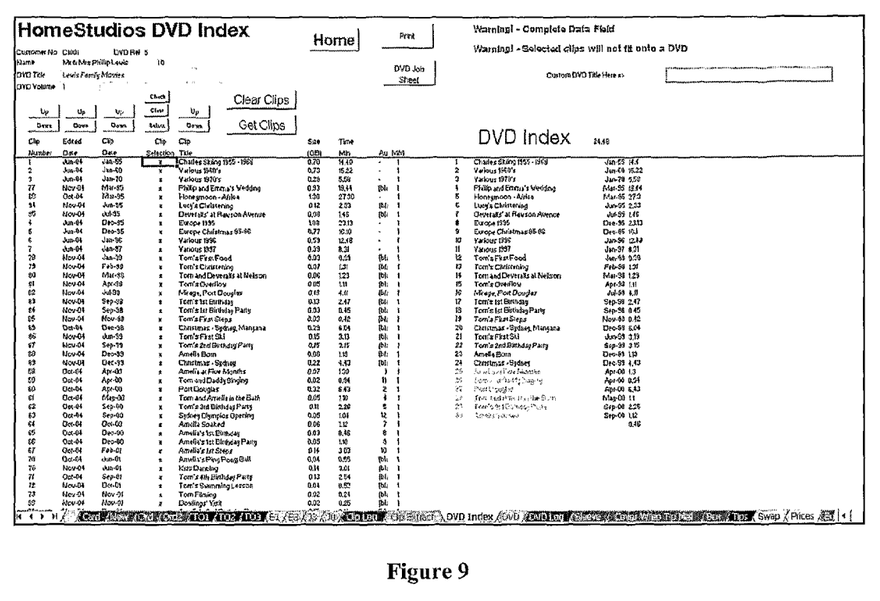
FIG. 9 shows a list of video clips for a specific customer, from which a choice may be made to create a video DVD.
Figure 10:
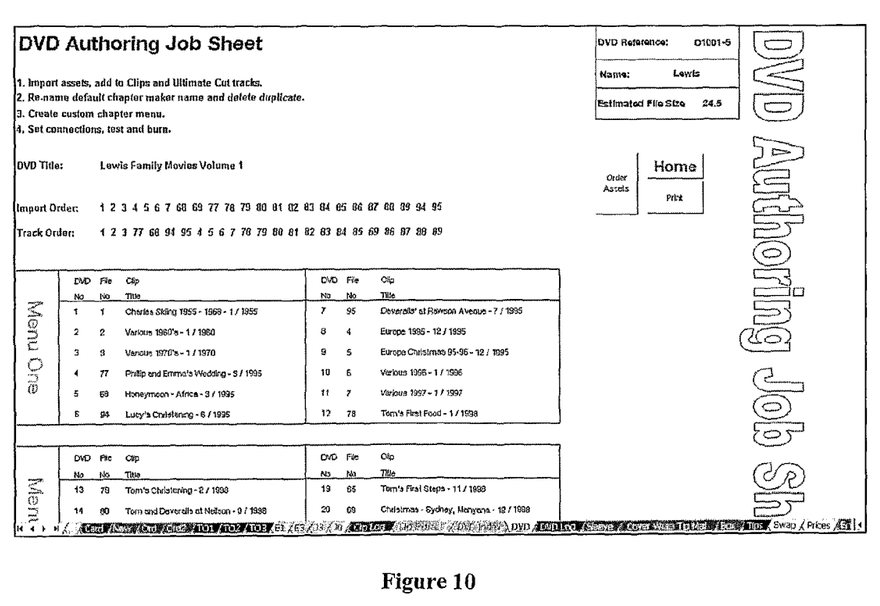
FIG. 10 shows a job sheet for creating a DVD video compilation.
Figure 11:
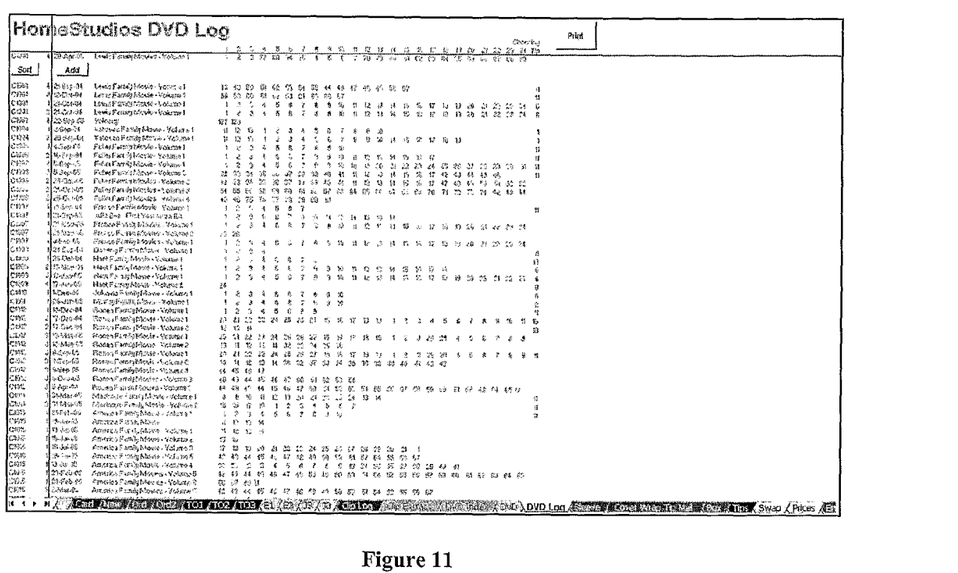
FIG. 11 shows a database of video orders.
Figure 12:
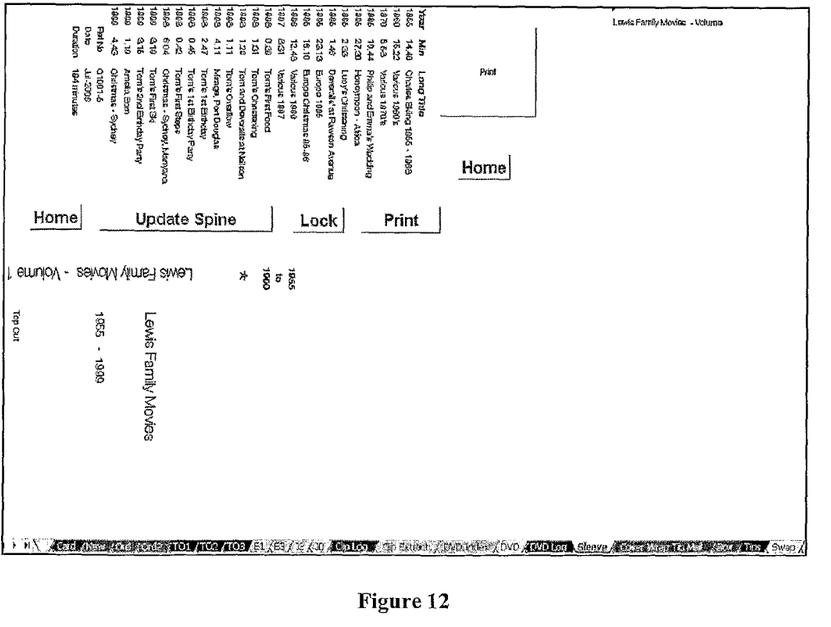
FIG. 12 shows the creation of a DVD sleeve.
Figure 13:
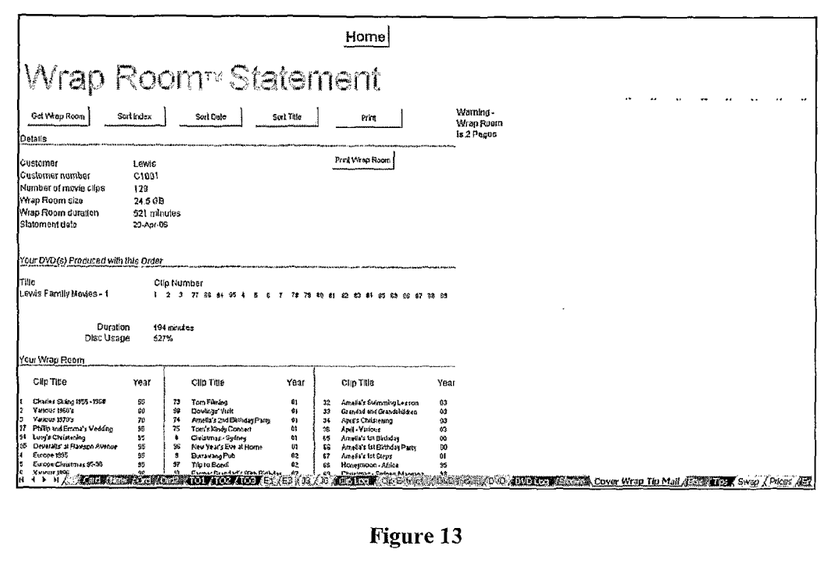
FIG. 13 shows a statement of the clips available for a specific customer.
Figure 14:
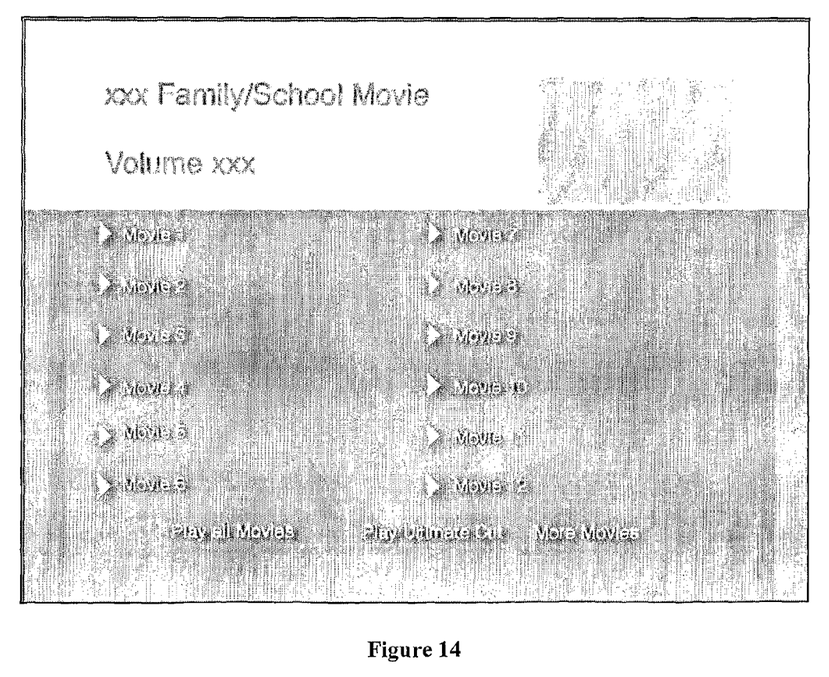
FIG. 14 shows a general menu for the DVD.

The DVD also is assembled to contain the usual front menu and index at the beginning, once it is played on a DVD player. The front menu allows a user to select a specific clip, or to play all of the clips in the DVD from the beginning. This menu preferably is in a standard style, and is created using the software application. An example of a general such menu is shown as FIG. 14.

A music track is added to the clips. The music is selected from a limited range, again according to a standardised procedure. The rules for selecting suitable music can be developed by trial and error, but generally the atmosphere engendered by the music should be consistent with the imagery being displayed. For example, lively music will be heard during a party, or solemn music will be heard in a serious situation. The music is normally orchestral, and chosen not to be intrusive. By "orchestral" is meant music that may lack lyrics or a voice track, or other distractions, but this may not necessarily always be so. The "orchestral" type of music is intended to be music that does not overly intrude on the listeners experience, nor add other mental imagery, which is often encountered with music containing lyrics. It may not just or actually be music produced by a traditional orchestra. Music often regarded as "elevator" music can be suitable for use with the present invention. Limiting the choice of music will help keep the costs and editing time to a minimum. The customer can request a change to the music during the review stage, but in this case, the operator will only swap one piece of music for another; the customer cannot specify their own choice of music.

The video clips in step (c) are preferably edited to include some music, but that may be omitted, or the music may fade in and out, since these sections of clips may have a sound track that is worth hearing. If the subject in the clip is talking, or providing sounds that are of interest, then this is allowed to remain, and the background music is muted or omitted. If there are no interesting sounds taking place then the background music may be used, or its sound level increased. In the shorter clips of step (d), music is preferably utilised, especially with the preferred use of slow motion for these segments.

Other media may be utilised apart from a DVD, such as streaming video over the internet, or other physical video formats, like CD-ROMs, tapes, mini-disks, and new video formats. Presently the DVD format is preferred.

The client may also have provided some additional information, such as the names of people appearing in the video, or names of places, or dates where and when the events displayed are taking place, but this is not necessary. Normally, the operator can resolve this information from the content of the video or its sound track. The operator can include this information in the job sheet data log. For example, the teacher may mention the names of students who are being captured on the video, or describe where and what is happening, and the operator can use this when logging the clips.

It may be preferred to then allow the customer an option to provide or review the titles and dates that are assigned to each clip. To do this, a form may be sent to the customer together with a rough compilation of all the edited clips. The customer may fill in the names of the people shown in the clips, as well as the dates this occurred, as well as this can be remembered or inferred. Or the operator's proposed titles and dates may be checked and updated. As another option, the client may log on to the editing organisation's computer system over the internet, and carry out this process using by this means, or by a combination of both approaches, such as viewing the clips over the internet and providing titles and dates on a paper form, for example. If the internet approach is utilised, then there would be security in place to permit only the right customer to see their own video material, such as requiring user identification, and a password to be entered.

Alternatively, and preferably, a set of uncontroversial titles may instead be selected so as to minimise the additional effort involved, and then proceeding without involving the client any further, or delaying the production of the final output.

If a draft DVD is sent to the customer for comment and review, it is normally marked and altered so as to prevent the customer using this version, which is of lower quality than the final product. For example, the image is washed out, and the text "DRAFT" may be superimposed on the image.

Once the customer approves the draft, the operator, who may be a different operator to those who may have already worked on the video, will assemble the final movie. In doing so, the customer's feedback will be taken into account. For instance, the titles will be updated from the customer's corrections.

Preferably, the application of the present invention will also automatically create a sleeve for the DVD, and optionally may create a design or title to print on the DVD itself. The sleeve is printed, to go into the DVD case, and will display the title, date, and so on, as well as the individual clips as an index, for viewers to jump straight to, using the DVD control capability, if they wish to do so.

An initial menu will display on the DVD, as well as an index of the scenes and clips it contains, and then the DVD will play the short montage of slow motion highlights. Preferably the second, summary, slow motion section will play in a section on the screen when the menu is displaying.

The finished DVD will be despatched to the customer, with a standard case and cover. The customer will be sent an account.

It is also preferred to provide the customer with a list of all the clips stored on the database by the video editing organisation. The customer may be charged an annual storage fee for holding this material. The customers therefore benefit from the existence of a backup copy of their video material.

Furthermore, customers may request other copies, or other compilations of the video material. They may be provided with a form, or be allowed access to the database, whereby they can easily select the compilation, or re-order a DVD.

The database should also keep name, address and other contact details of the customers. The database and software application should preferably automate the accounting system, and permit the clients access to the re-ordering capability, and to see the list of videos in their storage library.

As another preferred option, the customer may interact with the video processing organisation over the internet. This may involve providing a user with access to an internet web site, into which they can log in, using a previously supplied and unique user identification code and security password, to ensure each user only has access to their own material. The user may then interact with the processing organisation using this web interface. For example, the user may confirm their video, pay for it, re-order additional copies, and so forth, as set out above, using an internet web site, set up for this purpose.

Figure 15:
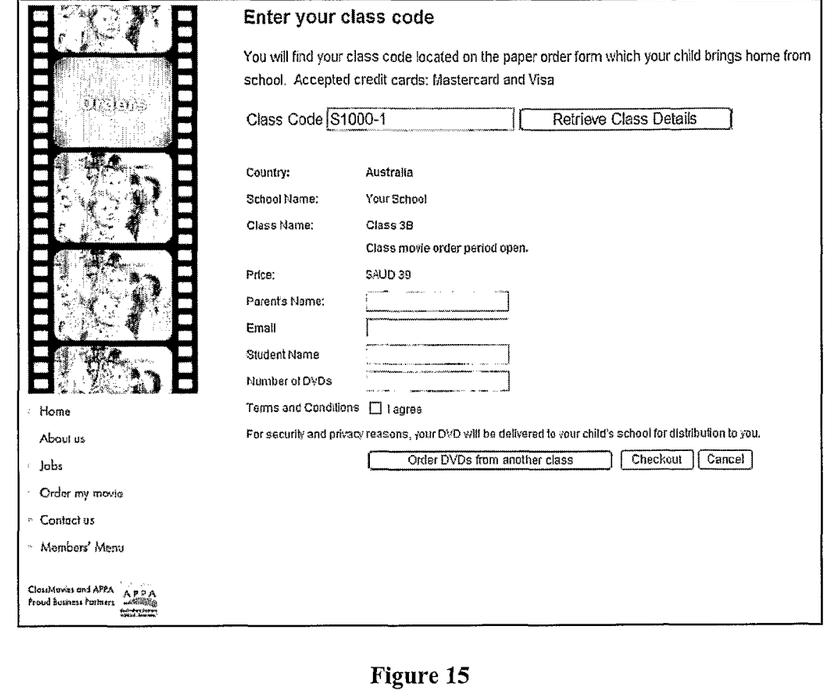
FIG. 15 shows a online order screen for internet access.
Figure 16:
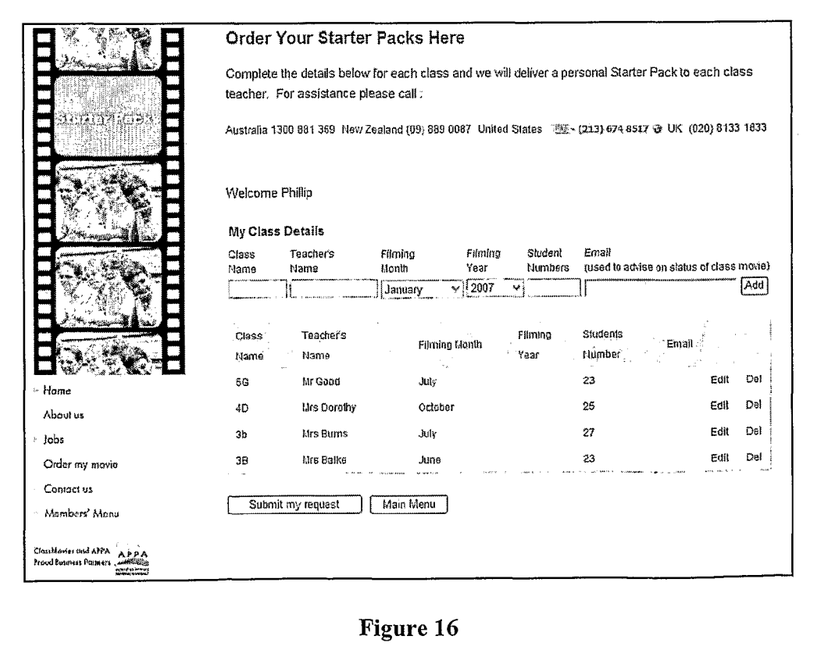
FIG. 16 shows more details of the order application of FIG. 15

It is preferred that the client may interact with the system using a web browser, over the internet via a personal computer connected to the internet, or via a similar means, such as a mobile telephone or the like, for example. An example of an interactive screen for achieving this is shown in FIGS. 15 and 16. The user would also be expected to be registered in the database, and to log on, after security verification. Some examples of screens, and the data that may need to be collected that allow this to happen, are provided in FIGS. 17 and 18, which shows this in relation to a school class.

EXAMPLES

Figure 19:
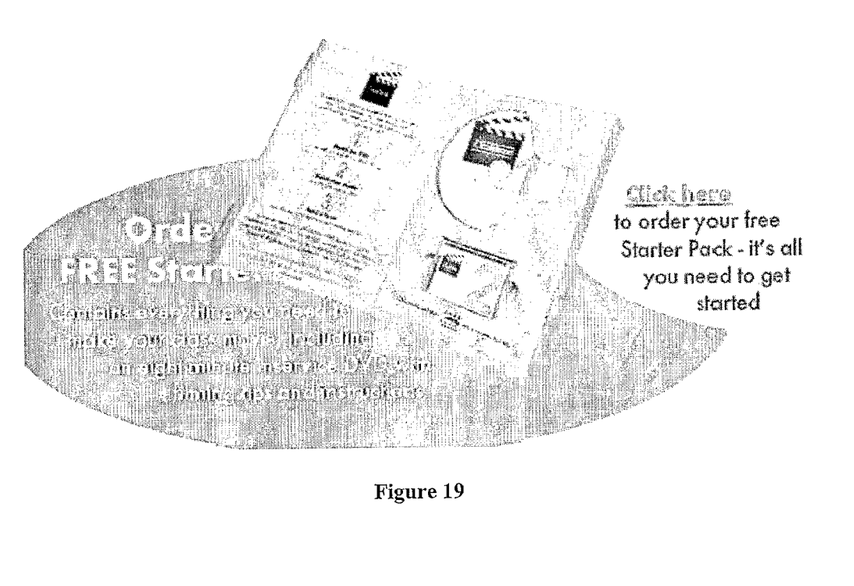
FIG. 19 shows a sample of a starter kit that may initially be provided to clients.

As one example of the process, video cameras and video tapes are provided by a video editing type "Studio" company in accordance with the present invention, to a school, and school teachers are provided with a training course, either in person, and/or via a training DVD, that explains how to use the video equipment and also about some techniques for taking good source material. Ideally, the teacher is provided with a starter kit, containing general information, parental consent and other forms, a blank tape, and a short training DVD, in a folder, along with an addressed envelope for the return of tapes. An example of such a kit is shown in FIG. 19. This kit may be provided for free, and it may be ordered over the internet, as shown in FIG. 19. Generally, a teacher will take videos, of their students in one class, in various situations, such as in the class room, at a sport carnival, or social event, and the like, and often recorded over a period of a week, at various times.

The completed digital tapes, and the cameras are then returned for processing, along with a form that the teacher has completed, identifying the class, teacher and student details, and the time period of the taping. The tapes that are provided may also have a unique identification code recorded on them, to help with the logging of the data onto the computer system.

The school is also provided with associated documentation, to obtain parental consent to be involved in the video, and copyright release forms, for example.

The teachers each use the camera to capture all their students in a class, on video tapes, which are then collected from the whole school, and returned to the Studio company's office. An appropriately addressed envelope or container may also be provided to assist with this, and optionally of a suitable type in order to protect the video tapes from damage while in transit.

The tape is then processed, and the video content copied onto a computer system. In this example, the video is copied onto an Apple "Mac" computer, so that the Apple "Final Cut Pro" video editing software product may be utilised to edit the material.

The returned video tapes are initially logged into the computer application's database by someone at the editing organisation.

The job is assigned to an operator. In this case, a student currently at a film school, is employed to do the editing, to earn some income. The operator reviews the content on the tape and follows the standard rules for editing and follows a predetermined template, in order to produce a rough cut of the material on the tape, as a series of clips. This reduces the total material to about one third of its original running time. This material can also be referred to as the "top cut".

The second section is created, by recutting short segments from each clip, into a slow motion summary, or what can also be referred to as the "ultimate cut".

The operator adds a sound track, again following the standardised procedures.

The clips created are archived into the database, and digitally encoded so as to compress the files. The clips are also catalogued, from notes provided by the operator on their job sheet. The cataloguing may be done by a secretary.

A DVD is authored, to compile a full movie. This is initially sent to the customer for review, with a form to allow feedback to be provided. This version of the DVD is washed out, to indicate it is not the final version, and have the word "DRAFT" superimposed across the images. Once the feedback is received, the DVD is edited to make any corrections indicated by the customer, and re-authored as a final DVD, which is then despatched to the customer. During this, the customer is billed for the job as well, preferably with a standard charge for editing each hour of raw footage supplied.

It will be apparent that obvious variations or modifications may be made in accordance with the spirit of the invention that are intended to be part of the invention, and any such obvious variations or modification are therefore within the scope of the invention.

INDUSTRIAL APPLICABILITY

The process for creating videos according to the invention is a standardised and scalable system for processing video footage, in a similar manner to how still photos are handled, when a customer takes a film to a film processor, and a short time later, receives back a finished set of photographs. The system allows for the production of a video DVD at a set price, without the need for input from a customer.

The invention claimed is:

1. A process for creating an edited video media, utilising a computer software system, which comprises the steps of,
    (a) providing a kit including an instructional DVD for training a user on how to provide suitable raw video footage and a blank media for recording raw video footage;
    (b) obtaining raw video footage and uploading the footage into the computer software system, if necessary converting the raw video into digital form;
    (c) cataloguing the raw video footage in a database;
    (d) having an operator edit the raw video footage following a predetermined procedure to create a plurality of video clips to be included on said video media;
    (e) having the operator edit the video clips, following a predetermined procedure to create a plurality of selected shorter segments showing the highlights from at least some of the clips from step (d), and to be included as another clip on said video media;
    (f) having the operator add a musical sound track, to the clips of steps (d) and
    (e); and
    (g) having the operator add titles before each clip, and assemble the clips into a movie on said video media,
    wherein said editing in step (d) involves editing the raw video footage into separate shorter segments, and selecting and keeping a segment from each individual scene provided in the raw footage, whereby the total running time is reduced to between 10 and 30 minutes per hour of raw footage.

2. The process of claim 1, wherein in step (g) a standard menu that indexes each clip is included on the video media.

3. The process of claim 1, wherein the editing in steps (d), (e) and (f) occurs without any input from, or reference to, the owner of the video footage.

4. The process of claim 1, wherein the cataloguing in step (c) records at least its properties, ownership and a unique identifier.

5. The process of claim 1, wherein said editing in step (d) involves, editing the raw video footage into separate segments, and deleting at least one of the segments, whereby the total running time is reduced to between 10 and 30 minutes per hour of raw footage.

6. The process of claim 1, wherein the total running time is reduced to between 15 to 22 minutes per hour of raw footage.

7. The process of claim 1, wherein in step (e), a shorter segment of about 1.5 seconds of running time is selected.

8. The process of claim 1, wherein in step (e), the combined clip is edited to play in slow motion.

9. The process of claim 8, wherein in step (e) the slow motion is about 4 second scenes at a 30% frame rate.

10. The process of claim 1, wherein in step (f), the musical sound track is assembled from a limited selection of music.

11. The process of claim 10, wherein the music is orchestral music.

12. The process of claim 10, wherein the music is selected to match the mood of the video material.

13. The process of claim 1, wherein after step (g), the movie is recorded on a DVD which can be played in a DVD player.

14. A process for creating an edited video media, utilising a computer software system, which comprises the steps of,
    (a) obtaining raw video footage and uploading the footage into the computer software system, if necessary converting the raw video into digital form;
    (b) cataloguing the raw video footage in a database;
    (c) having an operator edit the raw video footage following a predetermined procedure to create a plurality of video clips to be included on said video media;
    (d) having the operator edit the video clips, following a predetermined procedure to create a plurality of selected shorter segments showing the highlights from at least some of the clips from step (c), and to be included as another clip on said video media;
    (e) having the operator add a musical sound track, to the clips of steps (c) and (d); and (f) having the operator add titles before each clip, and assemble the clips into a movie on said video media;
    wherein the clips are incorporated within a database, and the database is adapted to allow a customer to re-order the purchase of a movie previously created, wherein the database is adapted to archive the clips and stores the amount of time of archival, and the quantity of clips, and charges a customer an amount of money commensurate with both.

15. The process of claim 14, wherein the database also allows a customer to request the creation of a different assembly of clips into another movie.

16. The process of claim 1, wherein the standard and predetermined procedure is selected to provide a professionally adept movie, by only following the procedure so chosen.

17. The process of claim 1, where the interaction between the user and the processor is carried out using a web site over the internet.

18. The process of claim 17, where the user submits a user identification code and a password in order to access their video materials on the web site.

19. A process for creating an edited video media, utilising a computer software system, which comprises the steps of,
    (a) obtaining raw video footage and uploading the footage into the computer software system, if necessary converting the raw video into digital form;
    (b) cataloguing the raw video footage in a database;
    (c) having an operator edit the raw video footage following a predetermined procedure to create a plurality of video clips to be included on said video media;
    (d) having the operator edit the video clips, following a predetermined procedure to create a plurality of selected shorter segments showing the highlights from at least some of the clips from step (c), and to be included as another clip on said video media; (e) having the operator add a musical sound track, to the clips of steps (c) and (d); and
    (f) having the operator add titles before each clip, and assemble the clips into a movie on said video media;
    wherein the edited video media is recorded on a DVD format and produced at a set cost, wherein the DVD format comprises a plurality of edited segments and has a playing time of up to half as long as that of said raw footage.

20. An internet application, which permits the performance of the process of claim 1, which allows a user to interact with a database containing the user's video material.

21. The process of claim 1, wherein the raw video footage is of at least one school student, and the edited video media is a memento or record of the student and their school.

* * * * *